United States Patent
Nelms et al.

[11] Patent Number: 5,929,773
[45] Date of Patent: Jul. 27, 1999

[54] SELECTIVE CALL DEVICE AND METHOD FOR BATTERY SAVING DURING INFORMATION SERVICES

[75] Inventors: Robert Nathan Nelms, Boynton Beach; Marcus A. Gade; Michael J. DeLuca, both of Boca Raton; Frederick Loring Kampe, Boynton Beach, all of Fla.; Scott Christopher Smith, St. Louis, Mo.

[73] Assignee: Motorola, Inc., Schaumburg, Ill.

[21] Appl. No.: 08/806,972

[22] Filed: Feb. 26, 1997

[51] Int. Cl.⁶ .................................................. G08B 5/22
[52] U.S. Cl. ........................... 340/825.44; 340/825.52; 455/38.1
[58] Field of Search ....................... 340/825.44, 905, 340/825.56, 825.27; 379/57, 59, 58; 455/38.1, 54.2, 186.1, 88

[56] References Cited

U.S. PATENT DOCUMENTS

| | | | |
|---|---|---|---|
| 4,845,491 | 7/1989 | Fascenda et al. | 340/825.44 |
| 5,089,813 | 2/1992 | DeLuca et al. | 340/825.44 |
| 5,555,446 | 9/1996 | Jasinski | 455/54.2 |
| 5,694,120 | 12/1997 | Indekeu et al. | 340/825.44 |

*Primary Examiner*—Michael Horabik
*Assistant Examiner*—Jean B. Jeanglaude
*Attorney, Agent, or Firm*—Keith A. Chanroo

[57] ABSTRACT

A selective call device (130) has a receiver (204) for receiving a selective call signal including an address (312) and a topic sub-address (504) indicative of a subscribed information, a processor (212, 214) for correlating the address (312) in the selective call signal to determine when the selective call signal is directed thereto, a decoder (212), in response to the processor (212, 214) determining that the selective call signal is directed thereto, for decoding the topic sub-address (504) to determine when the selective call signal includes the subscribed information, and a battery saver, coupled to the receiver (204), for initiating battery saving when the address (312) does not correlate with a predetermined address of the selective call device (130) and for initiating battery saving when the topic sub-address (504) is absent from the selective call signal.

18 Claims, 4 Drawing Sheets

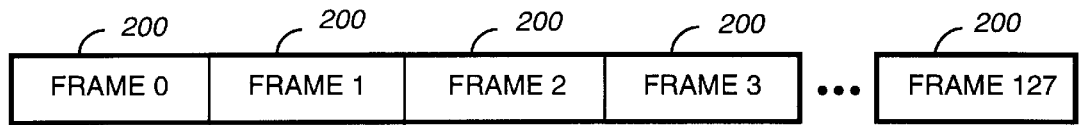
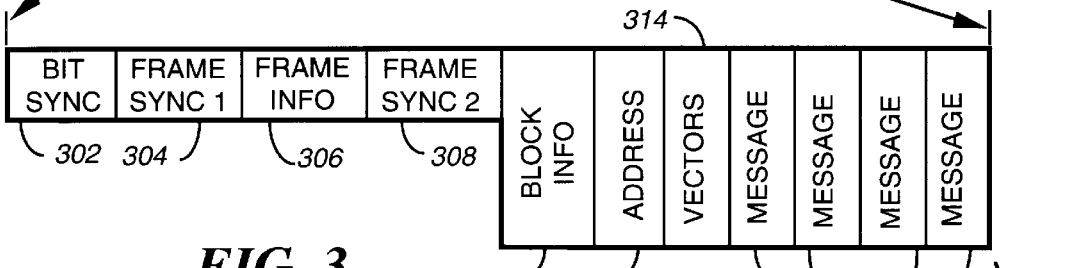
FIG. 2
FIG. 3
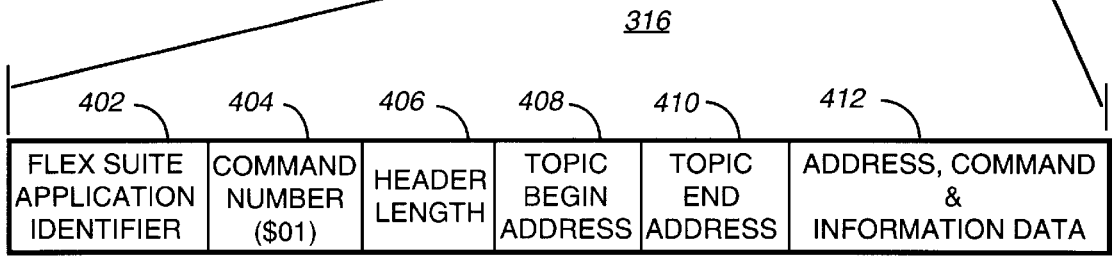
FIG. 4
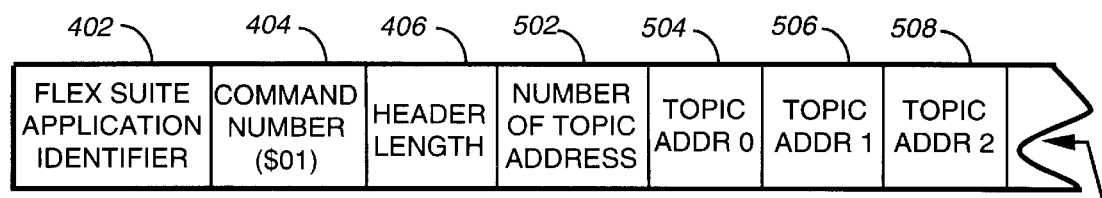
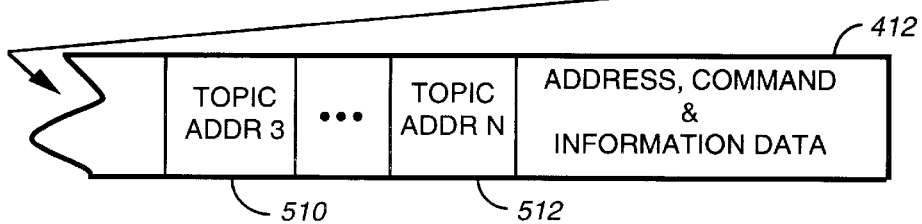
FIG. 5

SELECTIVE CALL DEVICE AND METHOD FOR BATTERY SAVING DURING INFORMATION SERVICES

FIELD OF THE INVENTION

This invention relates in general to communication systems and more specifically to a method in selective call devices for battery saving during information services.

BACKGROUND OF THE INVENTION

A conventional selective call device, e.g., a receiver and/or transmitter, often can receive messages from more than one sources. Sources are distinguished from each other typically by an address information associated with each message. When the address information correlates, or matches, a predetermined address in the selective call device, the selective call device receives and stores the message from a particular information source.

Modern selective call services or service providers are capable of sending multiple types of data including information services, for example, stock market, weather, sports, news or other information, periodically to a subscribing selective call device (receiver or transceiver). Before long, hundreds of information services are likely to be broadcast to selective call devices. With this rapid expansion, the number of available information services will easily exceed the amount of information a selective call device can easily receive or search through for locating the information to which it has subscribed to before destroying (depleting or reducing) the battery life of the selective call device.

Thus, what is needed is a method enabling the selective call device to quickly determine when information services being received are not intended for the selective call device for preserving battery life.

BRIEF DESCRIPTION OF THE DRAWINGS

FIGS. 2–5 are timing diagrams illustrating the transmission format of the signaling protocol utilized by the selective call system of FIG. 1 in accordance with the preferred embodiment of the present invention.

DESCRIPTION OF A PREFERRED EMBODIMENT

Figure 1:
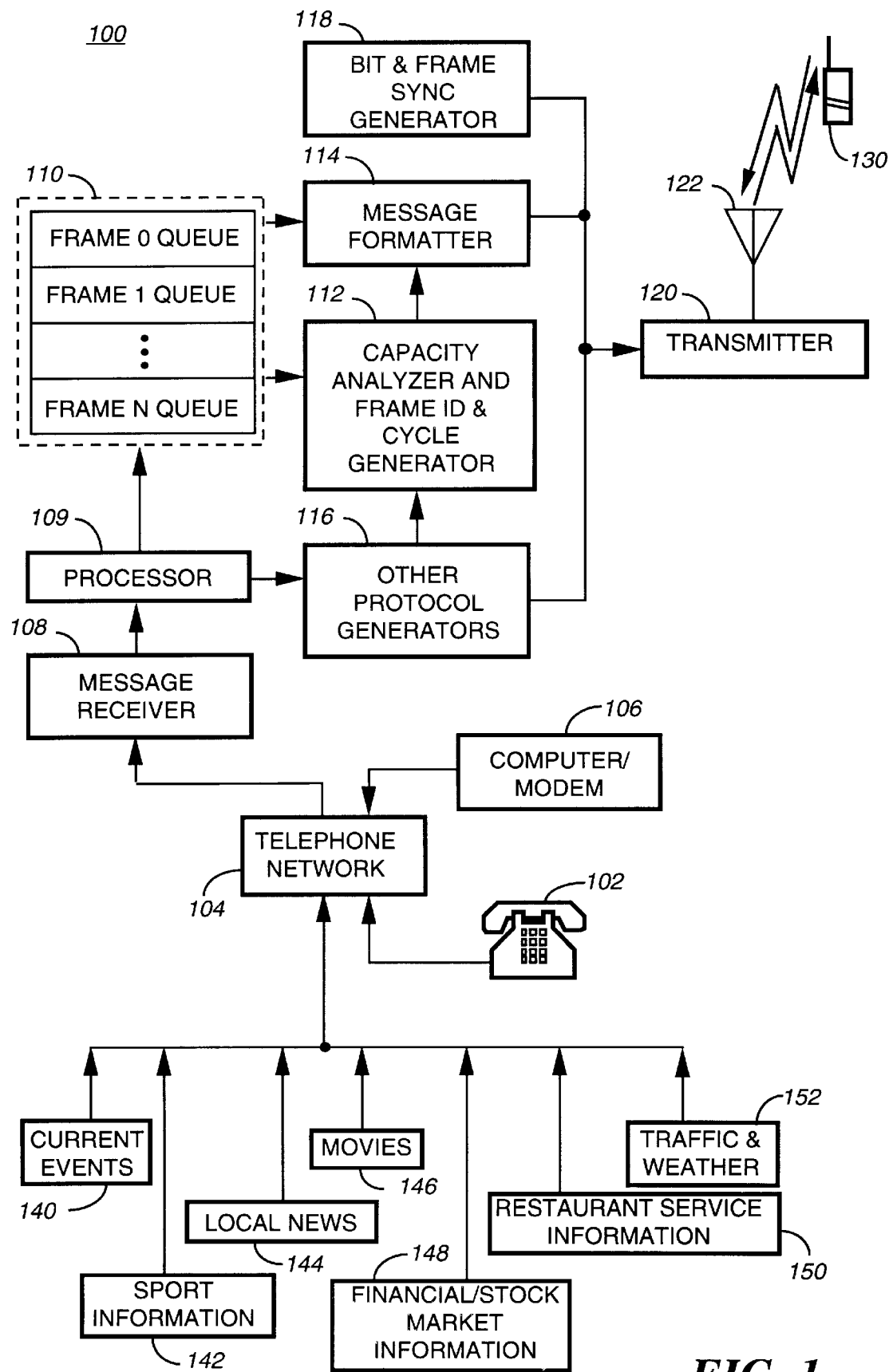
FIG. 1 is an electrical block diagram of a selective call system for providing information services in accordance with a preferred embodiment of the present invention.

FIG. 1 shows an electrical block diagram of a selective call system (or radio frequency communication system) for generating and transmitting (or broadcasting) a selective call signal (or communication signal) including a plurality of information services in accordance with a preferred embodiment of the present invention. The functions of the selective call system 100 are preferably implemented within software, for example within a MODAX 500 Selective Call Terminal which is manufactured by Motorola Inc. Typically, a subscriber can send a message by using a telephone 102 to initiate a transmission of a selective call message. As is well known, the telephone 102 couples to the selective call system 100, in particularly a base station or base site via a telephone network 104, the operation of which is well known to one of ordinary skill in the art. Similarly, a computer/modem 106 is also coupled to the telephone network 104 to enter information, for example alphanumeric or numeric messages. The telephone network 104 couples to a message receiver 108 which receives the messages to be transmitted (broadcast) to at least one of a plurality of selective call devices 130 typically from the public switched telephone network 104.

According to the preferred embodiment, a plurality of information services 140–152 are preferably coupled to the telephone interface network which is coupled to a processor 109 via the message receiver 108. Those skilled in the art will appreciate that the plurality of information service providers 140–152 can be received as radio frequency signal by an antenna.

When the base site processor 109 receives information which are periodically transmitted as updates, the information are encoded as a message in the form of a selective call signal (or communication signal). Specifically, the processor 109, coupled to the message receiver 108, determines an appropriate protocol, preferably, the FLEX™ protocol, and address to encode the information service. If the processor 109 determines that the message is to be sent via another signal format, it is passed to one of another protocol generator 116 which can include other protocol generators well known to one of ordinary skill in the art. When the processor has determined that the information services and any messages are to be transmitted on the FLEX™ protocol, the information are then encoded and stored in a frame queue buffer 110 which has queues (FRAME 0–N QUEUES) for the corresponding frames of the signal, and according to the preferred embodiment of the present invention, the corresponding number of frames N is 128. The predetermined frame identification (ID) of the selective call device 130 corresponding to the message is determined and the message is stored in the corresponding frame queue. A capacity analyzer and frame ID/cycle generator 112 determine the sequence of frame IDs to be transmitted and analyze the capacity of each frame to determine the cycle value to be used. The capacity analyzer 112 is also responsive to other protocols being transmitted. For example, if the expected occurrence of a frame is to be replaced by the transmission of one of the other protocols (thereby diminishing the capacity of the frame), the capacity analyzer 112 can account for this with the determined cycle value. A bit and frame sync generator 118 synchronously generates bit and frame synchronization signals. A message formatter 114 determines, in response to the address of selective call devices 130 and the frame queue, the frame which the information is to be included. The messages are then formatted for transmission. A transmitter 120 accepts signals from blocks 118, 114 and 116 and modulates and transmits radio frequency selective call signals to selective call devices 130 via antenna 122 in a manner well known to those of ordinary skill in the art.

Referring to FIGS. 2–5, timing diagrams of a signaling protocol in accordance with the preferred protocol for selective call messages are shown according to FIG. 1. Referring to FIG. 2, the selective call protocol is encoded, preferably according to the FLEX™ protocol, in a number of, preferably one-hundred-twenty-eight (128), message packets or frames 200. Each frame 200 is preferably 1.875 seconds in duration and has a preferred base data rate of 6400 bits per second. Although, it will be appreciated that other data rates can be used including the ability to use multiple data rates.

Referring to FIG. 3, each frame is comprised of a bit sync signal 302, preferably 32 bits of alternating 1,0 patterns, followed by a FRAME SYNC #1 signal 304 preferably having a predetermined thirty-two bit words and its thirty-two bit inverse, and a FRAME INFO signal 306, preferably one thirty-two bit word having twenty-one variable information bits containing information such as a cycle number and a frame number. The BIT SYNC signal 302 provides bit synchronization to the selective call device(s) 130 while the FRAME SYNC #1 signal 304 provides frame synchronization and includes a signal indicative of the data rate of the message information.

Following the FRAME INFO word 306 is a FRAME SYNC #2 308. Following the FRAME SYNC #2 308 is a block info word signal 310 including information such as the number of priority addresses, end of block information field, and vector start field. The code word of each frames 200 is preferably encoded as 31,21 Bose-Chaudhuri-Hocquenghem (BCH) code words having twenty-one information bits and ten parity bits generated according to the well known BCH algorithm. An additional even parity bit extends the word to a 32,21 code word. The addresses are located in block 312 and the vectors pointing to the messages are located in block 314 and the messages are located in the remaining blocks 316. Generally, all of the address signals within the frame are located in a first portion 312 and the information or message signals are located in a subsequent portion of the block 316. It is well known to those skilled in the art how to locate addresses 312 in a first portion and message information 316 in a second portion of the frame 200. Words 310–316 are shown in a vertical orientation to indicate that these words may be interleaved in order to improve the immunity of the transmission to burst errors. It is understood by one of ordinary skill in the art that interleaving may be modified or eliminated.

Referring to FIG. 4, the message information words 316 are illustrated in more details according to the preferred embodiment of the present invention. The information services 140–152 are encoded in message information words 316 for transmissions to the selective call devices 130. In particular, an application identifier 402 identifies the type of information, e.g., in this case, the application identifier 402 identifies that an information service, as opposed to numeric or alphanumeric selective call messages, is being transmitted. The application identifier 402 can also identify an application other than information services. Alternatively, the absence of the application identifier can indicate that the information or message is a regular selective call message.

Following the application identifier 402 is a command number 404. The command number 404 identifies (or describes) how the topics of the information services are being transmitted. For example, the command number identifies whether the topics of the information services are transmitted according to one of two preferred methods, (1) a range of topics method designated, e.g., by a command number of "000", where the range of the information topics are included, e.g., as the first and last topics (or offset from the first topic to the last topic); or (2) an itemized topic method, designated by e.g., by a command number of "001", where each topic of a particular transmission is included. As shown, the range method of FIG. 4 shows the topic begin sub-address 408 and the topic end sub-address 410 as the range. It is understood by one skilled in the art that the topic end sub-address can include either an offset from the topic begin sub-address or the actual topic end sub-address without departing from the scope of the invention disclosed herein. Notwithstanding, topic offsets, i.e., the range method, can be encoded is fewer bits than the topic address. Preferably, the information services or the topics of each information service are designated by unique numbers to facilitate the correlation between the topics and the information services. A header length 406 identifies the beginning to the end of the topic address fields, e.g., block 408 through block 410. The selective call devices 130 or other receiving devices that do not care about battery saving can use the header length to skip over the topic addresses to locate the information or message in the information data block 412. The range of the information topics are preferably transmitted as a topic begin address (sub-address) 408 which designates, e.g., the first or the beginning address that will be transmitted and a topic end address 410 which designates, e.g., the last (or the end) address (or sub-address) in the transmission. Therefore, by designating the information topic address in a sequential manner, e.g., either in ascending or descending order with unique identifiable numbers, the topic begin sub-address 408 and the topic end sub-address 410 (topic range) identify the possible information services that are included within a given transmission of the topic range. It is understood that the topic addresses could be transmitted in any order or no order. Therefore, a selective call device 130 that decodes the topic range can quickly determine whether the transmission includes the information services to which it is currently subscribing to because each information topic address is designated by a unique number transmitted in an ascending or descending order. When the topic address range 408, 410, does not include the unique topic address of the information services to which the selective call device 130 is subscribed to, the selective call device can immediately shut-down, battery save. Following the topic range 408, 410 (topic begin and end sub-addresses), the full addresses, commands and information data 412 for the information services are transmitted.

Therefore, a selective call device 130 can determine whether to receive a transmission of information services subsequent to decoding the topic begin and end addresses (topic range) 408, 410. The selective call device 130 will battery save if the information services that it subscribes to are not within the range of the topic begin address 408 and topic end address 410. Conversely, the selective call device 130 will continue to receive the transmitted information when the information being subscribed to are within the transmitted topic begin address 408 and the topic end address 410. Following the topic begin 408 and end addresses 410, are full addresses, commands and the information data.

Referring to FIG. 5, the second preferred embodiment of the protocol illustrating an itemized topic list. The itemized list is substantially similar to the topic address range method shown in FIG. 4 with the exception of the following. The header length 406 denotes the distances of the itemized list of topic address from a number of topic addressees 502 to the end of the itemized topic address ("TOPIC ADDR N") 512. The number of topic addresses 502 informs the selective call device 130 of the total number of topic addresses that are included in the itemized list of addresses 504–512. The itemized addresses 504–512 identify or correspond to the full addresses, commands and information data that are included in block 412.

In this way, when it is an information application data transmission, the selective call device checks the command number to determine if the range or the itemized method of topic addressing is used. When it is the range method, the first (or the begin or the start) topic address is sent followed by the last (or the end) topic address. If the selective call device's address is within the range, i.e., the begin and end addresses, it receives the remaining information to determine if any of the addresses correspond to the information services being subscribed to by the selective call device otherwise the selective call device battery saves. Alternately, when the itemized topic address method is used, the number of topic addresses and each topic address of each information service are included and when the topic address corresponds to the information of the selective call device, it searches for the full address and the information being subscribed to. The itemized list may be sent in an ascending order or descending order to enable the selective call device to quickly determine when its topic address is not in the itemized list to enable battery saving.

Figure 6:
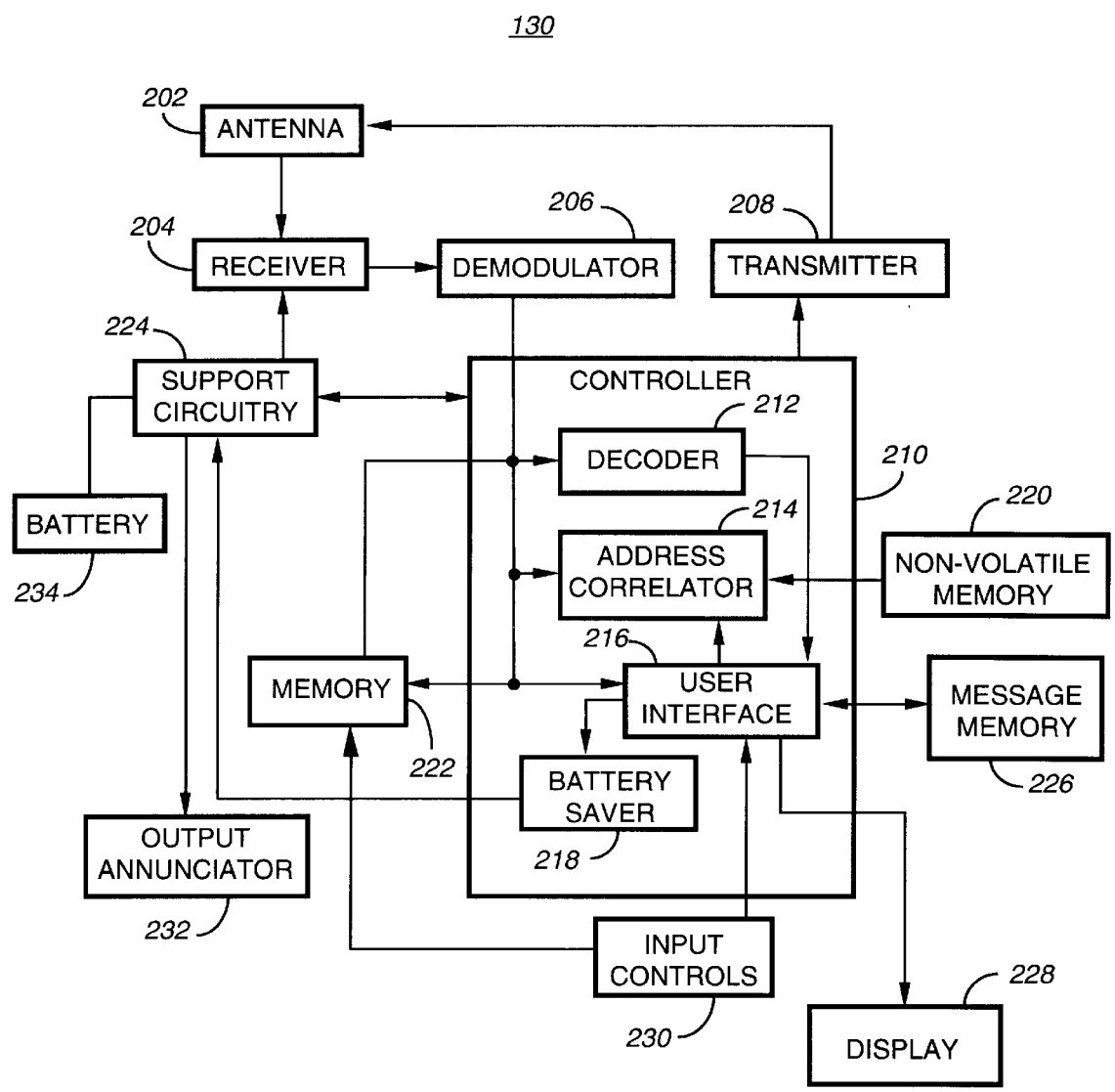
FIG. 6 is an electrical block diagram of a selective call device in accordance with the preferred embodiment of the present invention.

FIG. 6 shows an electrical block diagram of a selective call device according to the preferred embodiment of the present invention. The selective call device (e.g., transceiver or receiver) 130 is powered by a battery 234 and operates to receive and to transmit radio frequency signals via an antenna 202. A receiver 204 is coupled to the antenna 202 to receive the radio frequency signals. A demodulator 206 is coupled to the receiver 204 to recover any information signal present in the radio frequency signals using conventional techniques. The recovered information signal from the demodulator 206 is coupled to a controller 210 that decodes the recovered information in a manner well known to those skilled in the art.

In the preferred embodiment, the controller 210 comprises a microcomputer, such as a Motorola, Inc. manufactured microcomputer, e.g., 68HC11K4 or MC68HC11PH8, and has or comprises a signal processor performing the functions of a decoder which is normally implemented in both hardware and software. The signal processor comprises an address correlator 214 and a decoder 212, using methods and techniques known to those skilled in the art. The address correlator 214 checks the recovered information signal from the output of the demodulator 206 for address information and correlates a recovered address information with one of a plurality of predetermined address information that are stored in the selective call device's non-volatile memory 220. After the address correlator 214 determines that the received signal is directed to the selective call device 130, e.g., by correlating the address in the received signal to one of the predetermined addresses in the memory 220, the decoder 212 decodes the signal for the application identifier 402 to determine if the message contains information services data. Absence of the application identifier 402 (FIGS. 4 & 5) indicates that the message being decoded is a regular selective call message. Conversely, when the application identifier 402 is present and correlates to information service application identifier 402, the message comprises an information service. The application identifier 402, the command number 404, the topic addresses and information addresses are preferably stored in the memory 222.

When the user of the selective call device 130 has subscribed to at least one information service, the memory 222 is programmed, e.g., via over-the-air techniques or other appropriate methods of programming, with the information service addresses and associated topic addresses (or sub-addresses) and the associated topic addresses (or topic sub-addresses). The topic sub-addresses are associated with information services. Therefore, each information service has a unique topic address that allows the selective call device 130 to determine when the information service is present within a particular transmission or message. The topic address can be a short form of the information service sub-address or can be unique and different from the information sub-addresses while still being able to identify the presence of the information service within a particular transmission.

Status information are also stored in memory 222, for example, memory 222 is a non-volatile memory or electrically erasable memory indicating the information relating to the information service that the selective call device 130 is programmed to receive. Subsequent to the decoder decoding the presence of the application identifier 402, the decoder decodes the command number 404, the topic addresses (or sub-addresses) and the information service addresses (or sub-addresses) and the information in block 412. When the range method is decoded, e.g. command number is "000", the decoder further decodes the topic begin address 408 and the topic end address 410 using the header length 406 to determine the beginning and the ending positions. If the topic address corresponding to the information service(s) being subscribed to by the selective call device is not within the range of the topic begin address 408 and the topic end address 410, the decoder 212 strobes a user interface 216 causing the battery saver 218 to disable or remove power from the receiver 204 via a support circuitry 224.

On the other hand, when the itemized method is decoded, e.g., command number is "001", the number of topic addresses 502 are decoded followed by the itemized topic addresses 504–512. If the selective call device does not decode an address (or an information service sub-address) corresponding to one of its information services, the battery saver 218 initiates the removal of power to the receiver 204.

Conversely, when the topic sub-address is found within the itemized addresses 504–512, the controller decodes addresses, commands and information data in blocks 412. The controller 210 recovers the address information for the selected information service sent to the selective call device 130 and when it correlates with the information service sub-address stored in memory 222, the decoder 212 decodes the information service and stores the decoded information service in the message memory 226.

In this way, subsequent to the selective call device 130 verifying that the received information is directed to it (if not, the selective call device 130 battery saves), the selective call device 130 decodes the received information to determine if it includes an information signal directed to the selective call device 130. As discussed, the information data are identified by unique addresses or sub-addresses different from the selective call device's address to prevent the selective call device from searching the entire list of information data before it can determine that the received information does not contain the information service being subscribed to by the selective call device. As is well known, the service providers package the updates to the different information services and transmit them, and any selective call device 130 that is authorized to receive information service 140–152 will receive the information. The selective call device 130 with the use of the sub-addressing scheme can quickly determine that its information service is not included in any particular transmission. Upon such a determination, the selective call device 130 battery saves otherwise the battery would be quickly depleted if the selective call device 130 had to receive and search through the entire information data before it can determine that its information service is not present (or not found or absent).

After receiving, decoding, and storing the selected information service in a memory 226, the selective call device 130 typically presents at least a portion of the stored message to a user, such as by a display 228, e.g., a liquid crystal display. Additionally, along with receiving, decoding, and storing the information, an alert is presented to the user via an output annunciator 232. The alert can include an audible alert, a visual alert, a vibratory or silent alert, or a combination of the aforementioned alerts, using known methods and techniques.

The support circuit 224 preferably comprises a conventional signal multiplexing integrated circuit, a voltage regulator and control mechanism, a current regulator and control mechanism, audio power amplifier circuitry, control interface circuitry, and display illumination circuitry. These elements are arranged to provide support for the functions of the selective call device 130 as requested by a user.

Additionally, the controller 210 determines from the enabled or disabled status information in the memory 222 whether to conserve power upon detection of an address information. That is, when a received and recovered address information correlates with a predetermined address in the non-volatile memory 220, the controller 210 checks the status information corresponding to the correlated predetermined address information to determine whether that address is enabled. If the controller 210 determines that the correlated predetermined address is not enabled then the decoder 212 is not invoked Further, the controller 210 instructs the battery saver 218 to begin conserving the power of the selective call device 130. The battery saver 218 signals the support circuit 224 to enter a low power mode (battery save mode). A number of power consuming circuits may be directed to a low power or standby mode of operation Additionally, the signal from the battery saver 218 signals, or strobes, the receiver circuitry 204 to a low power mode to conserve power.

In this way, when a correlated address is not enabled, as indicated by the associated status information, the selective call device 130 conserves power immediately, while not decoding an associated message and also not storing the message in message memory 226. Of course, the battery saver 218 will re-enable the receiver and other circuits at some later time. Methods of power conservation strobing in selective call devices are known to those skilled in the art. Further, the controller 210 inhibits any alerts to the user via the output annunciator 232. By not alerting again, power conservation is maximized. The status information, corresponding to each predetermined address information stored in the memory 222, allow the controller 210 to disable functions in the selective call device 130, and to conserve power when a correlated address is disabled, e.g., when no information service is selected for the address port. Input controls 230 are coupled to the memory 222 and the user interface 216 for receiving user inputs, including but not limited to programming, manipulating data and sending commands to the selective call device 130.

Additional to battery saving when the address of the selective call device 130 is not received, the selective call device 130 can battery save when it determines that the information service or updates thereto do not contain the particular information service that is being subscribed to by the selective call device 130. In this way, the information services are identified by information service addresses and topic addresses (sub-addresses) which are transmitted with the information services to enable the selective call devices 130 to determine when a transmission includes the desired information service Since there are a large number of available information service topics, the battery life would be destroyed if the selective call device was required to search all information transmissions for its information topic. Therefore, by checking for the topic address and the information address, the selective call device is able to initiate battery saving in addition to its ability to battery save when the address of the selective call device is not received.

Figure 7:
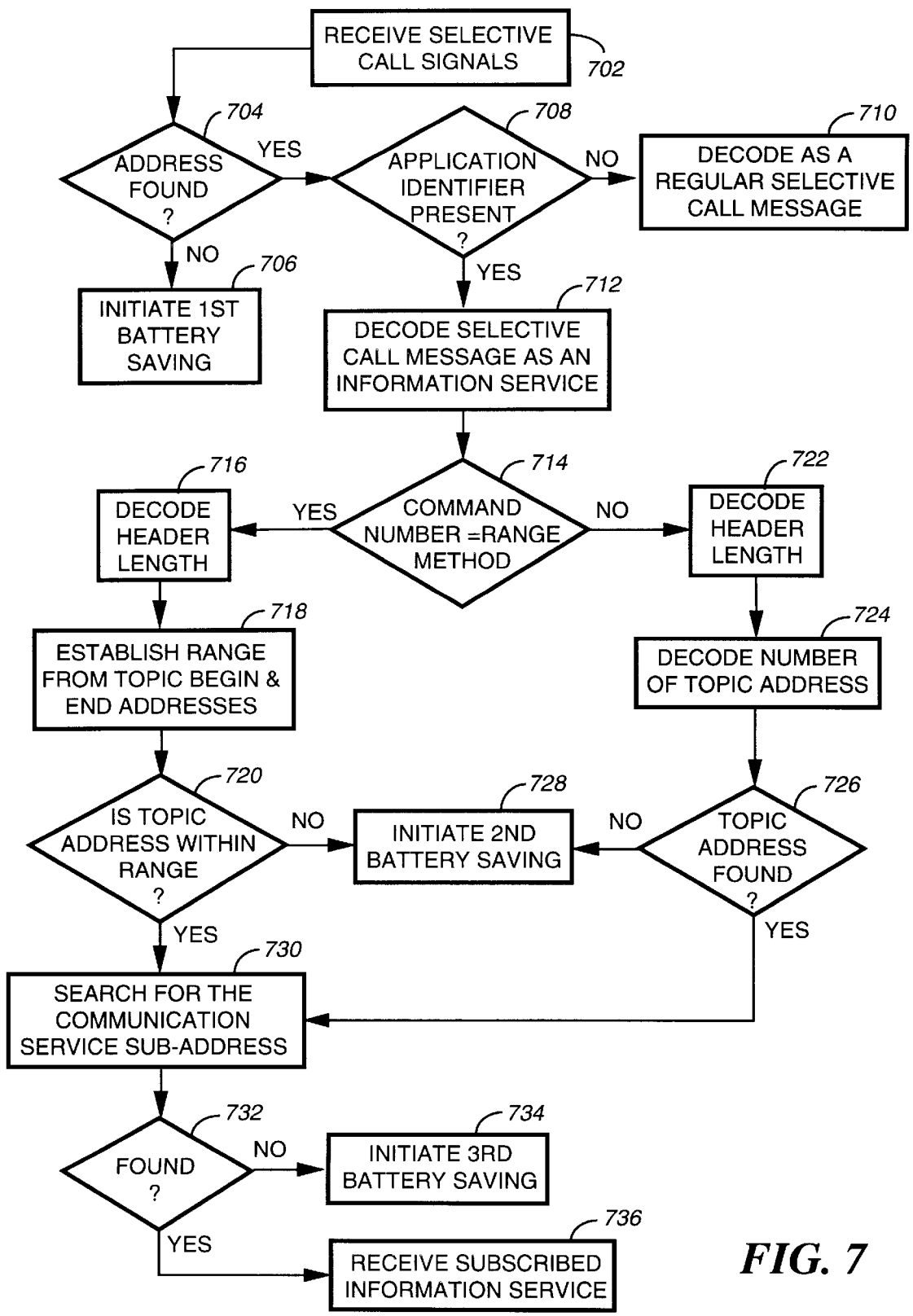
FIG. 7 is a flow diagram of the selective call device of FIG. 6 illustrating the steps of receiving the available information services.

Referring to FIG. 7, a flow diagram of the selective call device of FIG. 6 is shown illustrating the steps of receiving information services. The selective call signals (or communication signals) including an address identifying at least one selective call device for receiving the information service data. The selective call signals further comprise information service sub-addresses and topic sub-addresses for identifying or associating with the plurality of information service data being transmitted in the selective call signals, step 702. After the receipt of the selective call signals, the address correlator correlates the received address with the addresses stored in memory 220 to determine if the selective call signal (or communication signal) is directed to the selective call device 130, step 704. If the received address does not correlate with the addresses of the selective call device, step 704, the controller initiate the battery saving which can be designated as the first battery saving routine, step 706. Conversely, when the selective call signals are directed to the selective call device (the received address matches one of the predetermined addresses in memory), the controller searches for the application identifier to determine the type of information being broadcast or transmitted, step 708. When the application identifier is not present, the message or information is decoded as a regular selective call message in a manner well known in the art, step 710. Alternatively, when the application identifier is present, step 708, the selective call message or information is decoded as an information service to be discussed in detail below, step 712. The command number is received and a determination is made whether the command number corresponds to the range method of topic address decoding, step 714. If so, the header length is decoded to determine the starting position and end (offset) position of the topic addresses, step 716. In the case of the range method, the header length identifies the position of the topic begin address and the topic end address or topic offset. With the topic begin address and the topic end address, the range of topic addresses can be determined, step 718. When the range is determined, the controller determines if the topic address (es) of any information subscribed to (subscribed information or subscribed information service) by the selective call device are within the range of topic addresses included in the selective call signals being received, step 720. It is appreciated that the command number, as determined in step 714, can include a third option, not shown, that allows the selective call devices 130 to omit battery saving when, e.g., the message is short or when airtime efficiency is more important than the battery lives of the subscribing selective call devices 130.

Returning to step 714, when the command number is not indicative of the range method but it indicative is the itemized method of encoding topic addresses in the selective call signals, the decoder decodes the header length which identifies the beginning positions of the first and last itemized topic addresses in the decoded selective call signal, step 722. The decoder thereafter decodes the number of itemized topic addresses that are included in the decoded selective call signals, step 724. It can be appreciated that the itemized topic address encoding and decoding scheme is better suited for smaller numbers of information topic addresses while the range encoding and decoding scheme is better suited for a transmission that includes larger numbers of information services and topic addresses.

The itemized topic addresses 502–512 are searched for by the selective call device and when located they are correlated with the topic address(es) of the selective call device indicative of the information services that are subscribed to (subscribed information or subscribed information service) by the selective call device, step 726. From steps 720 and 726, if the topic address corresponding to the subscribed information is not found, the controller initiates a second battery saving, step 728. In this way, the selective call device is able to quickly battery save without searching through the entire information service data to determine that the subscribed information is not within the selective call transmitted signals.

Conversely, when the topic address is found, steps 720 and 726, the decoder searches or decodes the information service sub-address corresponding to the topic address, step 730. When the information service sub-address is not found or upon a failure to decode the information service sub-address, step 732, the controller initiates a third battery saving for enabling the selective call device to be able to battery save even when the topic address is found but when the full information service sub-address is not found, step 734. It is preferred that the topic address is a shortened version of the information service sub-address, therefore, it is possible to have found the topic address while the corresponding information service sub-address is not present (absent or not found) within the selective call signals. When the corresponding information service sub-address is found, step 732, the decoder receives, stores and presents the information service data, step 736.

In summary, in a selective call system, a method is provided that comprises the steps of encoding a selective call signal with an address designating a selective call device, a topic address and an information service sub-address corresponding to a subscribed information of the selective call device and broadcasting the selective call signal to a plurality of selective call devices subscribing to an information service provider. In the selective call device, a method comprises the steps of receiving a communication signal comprising an address and a topic sub-address indicative of a subscribed information service, initiating a first battery saving when the address is not received, decoding the communication signal for the topic sub-address in response to a receipt of the address and initiating a second battery saving when the topic sub-address is not decoded indicating an absence of the subscribed information. The method further comprising the steps of decoding the communication signal for an information service sub-address indicative of the subscribed information service in response to decoding the topic sub-address and initiating a third battery saving upon a failure to decode the information service sub-address.

We claim:

1. A selective call device, comprising:
   a receiver for receiving a selective call signal including an address and a topic sub-address indicative of a subscribed information;
   a processor for correlating the address in the selective call signal to determine when the selective call signal is directed thereto;
   a decoder, in response to the processor determining that the selective call signal is directed thereto, for decoding the topic sub-address indicative of the subscribed information to be received; and
   a battery saver, coupled to the receiver, for initiating battery saving when the address does not correlate with a predetermined address of the selective call device and for initiating battery saving when the selective call signals include the address and the topic sub-address is absent from the selective call signal.

2. The selective call device according to claim 1 wherein the decoder decodes the selective call signal for an information service sub-address associated with the subscribed information.

3. The selective call device according to claim 2 wherein the battery saver initiates battery saving when the information service sub-address is absent.

4. The selective call device according to claim 2 wherein the decoder decodes the information service sub-address of the subscribed information in response to decoding the topic sub-address of the subscribed information.

5. A method, comprising the steps of:
   receiving a communication signal comprising an address and a topic sub-address indicative of a subscribed information service;
   initiating a first battery saving when the address is not received;
   decoding the communication signal for the topic sub-address in response to a receipt of the address; and
   initiating a second battery saving when the topic sub-address is not decoded indicating an absence of the subscribed information service.

6. The method according to claim 5 wherein the step of decoding further comprising the steps of:
   decoding the communication signal for an information service sub-address indicative of the subscribed information service in response to decoding the topic sub-address; and
   initiating a third battery saving upon a failure to decode the information service sub-address.

7. The method according to claim 5 wherein the step of decoding further decodes the communication signal for a command number indicative of a range of topic sub-addresses.

8. The method according to claim 7 wherein the step of initiating initiates the second battery saving when the topic sub-address of the subscribed information service is not within the range of topic sub-addresses comprising a topic begin sub-address and an offset therefrom.

9. The method according to claim 7 wherein the step of initiating initiates the second battery saving when the topic sub-address of the subscribed information service is not within the range of topic sub-addresses comprising a topic begin sub-address and a topic end sub-address.

10. The method according to claim 5 wherein the step of decoding further decodes the communication signal for a command number indicative of a range or an itemized list of topic sub-addresses.

11. The method according to claim 10 wherein the step of initiating initiates the second battery saving when the topic sub-address of the subscribed information service is not one of the itemized list of topic sub-addresses.

12. In a selective call system, a method comprising the steps of:
   encoding a selective call signal with an address designating a selective call device, a topic address and an information service sub-address corresponding to a subscribed information of the selective call device;
   broadcasting the selective call signal to a plurality of selective call devices subscribing to an information service provider, in the selective call device comprising the steps of:
   receiving a communication signal comprising an address and a topic sub-address indicative of a subscribed information service;

initiating a first battery saving when the address is not received;

decoding the communication signal for the topic sub-address in response to a receipt of the address; and initiating a second battery saving when the topic sub-address is not decoded indicating an absence of the subscribed information.

13. The method according to claim 12 wherein the step of decoding further comprising the steps of:

decoding the communication signal for an information service sub-address indicative of the subscribed information service in response to decoding the topic sub-address; and initiating a third battery saving upon a failure to decode the information service sub-address.

14. The method according to claim 12 wherein the step of decoding further decoding the communication signal for a command number indicative of a range of topic sub-addresses.

15. The method according to claim 14 wherein the step of initiating initiates the second battery saving when the topic address of the subscribed information is not within the range of topic sub-addresses comprising a topic begin sub-address and a topic end sub-address.

16. The method according to claim 14 wherein the step of initiating initiates the second battery saving when the topic address of the subscribed information is not within the range of topic sub-addresses comprising a topic begin sub-address and an offset therefrom.

17. The method according to claim 12 wherein the step of decoding further decoding the communication signal for a command number indicative of an itemized list of topic sub-addresses.

18. The method according to claim 17 wherein the step of initiating initiates the second battery saving when the topic address of the subscribed information is not one of the itemized list of topic sub-addresses.

* * * * *